(12) United States Patent
Becker et al.

(10) Patent No.: US 8,897,409 B2
(45) Date of Patent: *Nov. 25, 2014

(54) SYMBOL TIMING ACQUISITION USING EARLY-LATE INTERPOLATION

(75) Inventors: Donald W. Becker, Ranco Santa Fe, CA (US); Matthew D. Nimon, Hinckley, OH (US); William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/451,104

(22) Filed: Apr. 19, 2012

(65) Prior Publication Data

US 2012/0207198 A1     Aug. 16, 2012

Related U.S. Application Data

(63) Continuation of application No. 12/641,451, filed on Dec. 18, 2009, now Pat. No. 8,184,756.

(60) Provisional application No. 61/138,676, filed on Dec. 18, 2008.

(51) Int. Cl.
*H04L 7/00* (2006.01)
*H04B 7/185* (2006.01)

(52) U.S. Cl.
CPC .......... *H04L 7/0029* (2013.01); *H04B 7/18513* (2013.01)
USPC ........... 375/355; 375/362; 375/365; 375/371; 375/149; 375/343

(58) Field of Classification Search
CPC .... H04B 1/7085; H04B 1/7075; H04B 1/707; H04B 1/709; H04B 1/70755; H04B 1/7093; H04L 7/042; H04L 27/2662; H04L 1/7093; H04L 7/0337; H04L 7/0334; H04L 7/091; H04L 7/033; H04L 7/0029; H04L 7/04; H04L 7/08; H04L 7/041; H04L 7/046; H04L 7/0338; H04J 3/0608; H03L 7/0814; G06F 1/10
USPC ................. 375/355, 362, 365, 371, 149, 343
See application file for complete search history.

(56) References Cited

U.S. PATENT DOCUMENTS

| | | |
|---|---|---|
| 6,563,897 B1 | 5/2003 | Kitta |
| 7,778,363 B2 | 8/2010 | Inagawa et al. |
| 2003/0128777 A1 | 7/2003 | Linsky et al. |
| 2005/0117674 A1 | 6/2005 | Jeon et al. |

(Continued)

OTHER PUBLICATIONS

Non-final Office Action dated Jan. 16, 2013, U.S. Appl. No. 12/641,537, 15 pgs.

(Continued)

*Primary Examiner* — Phuong Phu
(74) *Attorney, Agent, or Firm* — Holland & Hart LLP

(57) ABSTRACT

Symbol timing acquisition is described for a wireless broadband signal received at a user terminal from a gateway via a satellite. In-phase and quadrature channels of the wireless signal may each be sampled at a rate of one sample per symbol. The samples may be interpolated to generate an early interpolation and a late interpolation for each of the samples. A difference measurement is obtained between the early interpolation and the late interpolation for a set of the samples. A number of the difference measurements may be averaged, and symbol timing may be modified based on the average. This process may be continued on an iterative basis to acquire symbol timing.

25 Claims, 9 Drawing Sheets

(56) References Cited

U.S. PATENT DOCUMENTS

| | | |
|---|---|---|
| 2006/0039453 A1 | 2/2006 | Yamada |
| 2006/0098716 A1 | 5/2006 | Pietraski et al. |
| 2007/0160158 A1 | 7/2007 | Zeng et al. |
| 2008/0170645 A1 | 7/2008 | Kleider et al. |
| 2009/0016467 A1 | 1/2009 | Lui et al. |
| 2009/0067515 A1 | 3/2009 | Galperin et al. |
| 2010/0158179 A1 | 6/2010 | Becker et al. |
| 2010/0159861 A1 | 6/2010 | Becker et al. |

OTHER PUBLICATIONS

Non-final Office Action (*Ex Parte Quayle*), U.S. Appl. No. 12/641,451, dated Nov. 22, 2011, 5 pgs.

Notice of Allowance, U.S. Appl. No. 12/641,451, dated Jan. 20, 2012, 8 pgs.

Final Office Action dated Jul, 30, 2013, U.S. Appl. No. 12/641,537, 16 pgs.

Notice of Allowance dated Nov, 15, 2013, U.S. Appl. No. 12/641,537, 10 pgs.

SYMBOL TIMING ACQUISITION USING EARLY-LATE INTERPOLATION

CROSS-REFERENCES TO RELATED APPLICATIONS

This application is a continuation of co-pending U.S. patent application Ser. No. 12/641,451, filed Dec. 18, 2009, entitled "SYMBOL TIMING ACQUISITION USING EARLY-LATE INTERPOLATION", which claims priority from U.S. provisional patent application No. 61/138,676, filed Dec. 18, 2008, entitled "SYMBOL TIMING ACQUISITION AND FREQUENCY ESTIMATION", each of which is hereby expressly incorporated by reference in their entirety for all purposes.

BACKGROUND

The present invention relates to wireless communications in general and, in particular, to satellite communications.

Broadband satellite services are gaining traction in North America. While such first generation satellite systems may provide multi-gigabit per second (Gbps) per satellite overall capacity, many current designs of such systems may inherently limit the number of customers who may be served with sufficient bandwidth. While existing designs have a number of capacity limitations, the demand for such broadband services continues to grow.

To meet such demands, multi-beam satellites may combine a number of high speed communication links with Variable Coding and Modulation (VCM) or Adaptive Coding and Modulation (ACM). According to the message type and the link condition, VCM and ACM transmitters utilize codes of various rates and sizes and modulations of different orders to take advantage of favorable channel conditions. Symbol timing acquisition and tracking can present difficult challenges in such an environment, and novel techniques may be useful in addressing these issues to increase capacity and meet this growing demand.

SUMMARY

Systems, devices, processors, and methods are described which may be used for the reception of a wireless broadband signal via satellite. In one set of embodiments, a wireless signal is transmitted from the gateway to terminals via satellite, the signal including a series of symbols. The wireless signal may be received at the terminal. The received wireless signal may be processed to produce a digitized stream representative of the received wireless signal. In one set of embodiments, this stream may be processed to acquire the symbol timing.

In some embodiments, aspects of a wireless signal (e.g., in-phase and quadrature channels) may each be sampled at a rate of one sample per symbol. Each of the samples are interpolated to generate an early interpolation and a late interpolation for each of the samples. Difference measurements are obtained between the early interpolation and the late interpolation for a set of the samples. A number of the difference measurements are averaged, and symbol timing is modified based on the average. This process may be continued on an iterative basis to acquire symbol timing.

In one such embodiment, in-phase and quadrature channels of the wireless signal are sampled at a rate of one sample per symbol to generate the series of samples. The samples may be run through a pair of filters that perform an early-late interpolation (e.g., interpolating to ¼ symbol period early and ¼ symbol period late). Early and late in-phase and quadrature pairs may be converted to polar coordinates, and the later radius value subtracted from an earlier radius value to get a difference measurement corresponding to a symbol timing error metric. The errors may be averaged and multiplied by a symbol rate dependent gain to normalize the error with respect to symbol rate, and then input to a PI control loop. The output may be used to control the symbol timing.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Symbol timing acquisition is described for a wireless broadband signal received at a user terminal from a gateway via a satellite. Aspects of the wireless signal (e.g., in-phase and quadrature channels) may each be sampled at a rate of one sample per symbol. The samples may be interpolated to generate an early interpolation and a late interpolation for each of the samples. A difference measurement is obtained between the early interpolation and the late interpolation for a set of the samples. A number of the difference measurements may be averaged, and symbol timing may be modified based on the average.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
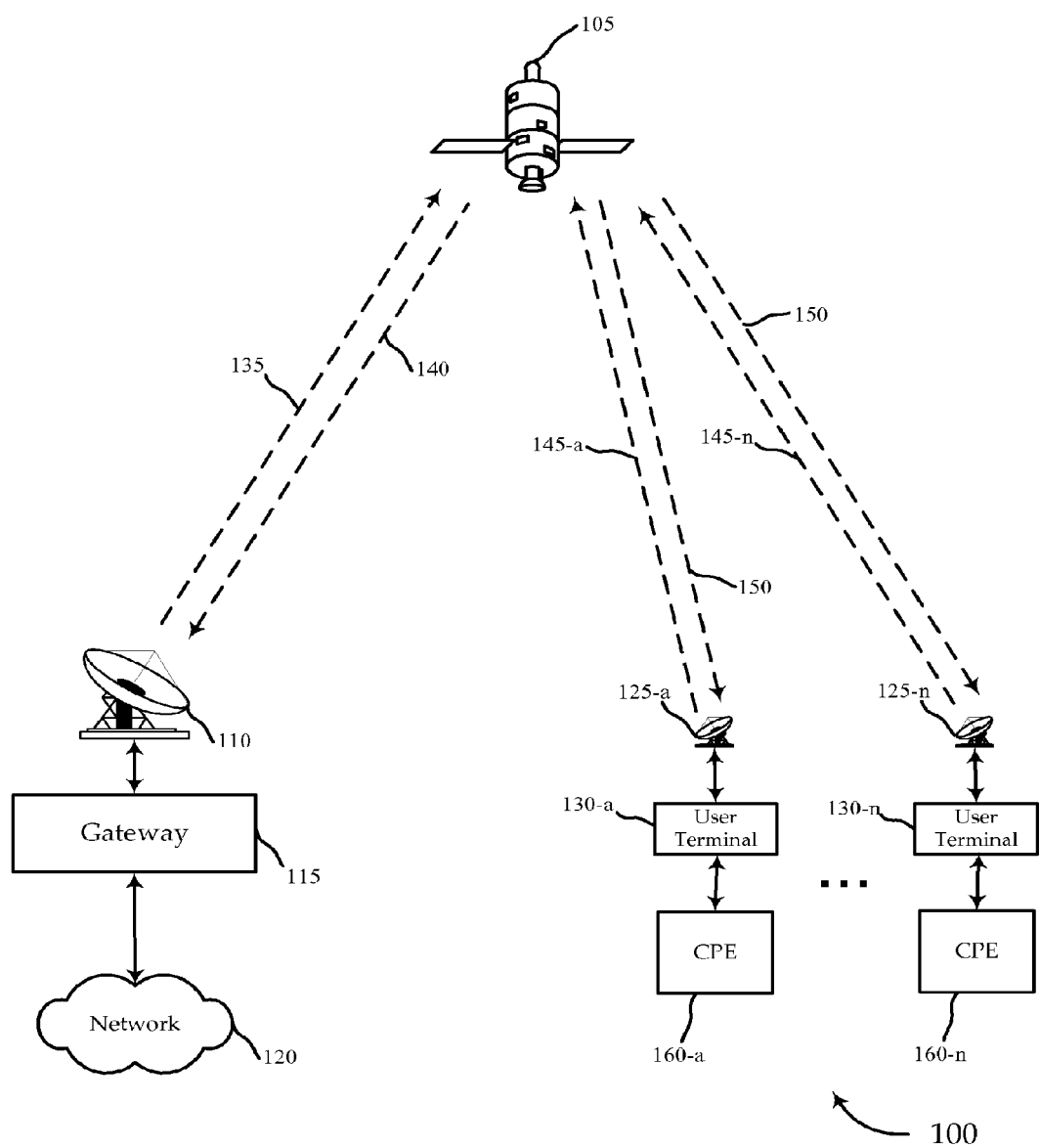
FIG. 1 is a block diagram of a satellite communications system configured according to various embodiments of the invention.

Systems, devices, methods, and software are described for symbol timing acquisition for a received satellite communications signal. Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more user terminals 130, via a satellite 105. The symbol timing techniques discussed herein may be used by a user terminal 130 to process signals received from a gateway 115 via satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network 120 may connect the gateway 115 with other gateways (not pictured), which are also in communication with the satellite 105, and which may share information on link conditions and other network metrics.

The gateway 115 provides an interface between the network 120 and the user terminal 130. The gateway 115 may be configured to receive data and information directed to one or more user terminals 130, and format the data and information (e.g., using CCM, ACM, or VCM) for delivery downstream to the respective user terminals 130 via the satellite 105. Similarly, the gateway 115 may be configured to receive upstream signals from the satellite 105 (e.g., from one or more user terminals 130) directed to a destination in the network 120, and can format the received signals for transmission through the network 120.

A device (not shown) connected to the network 120 may, therefore, communicate with one or more user terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the Digital Video Broadcast—Second Generation (DVB-S2) and World Interoperability for Microwave Access (WiMAX) standards. The gateway 115 may use a broadcast signal, with a modulation and coding format adapted for each packet to the link conditions of the user terminal 130 or set of user terminals 130 to which the packet is directed (e.g., to account for the variable service link 150 conditions from the satellite 105 to each respective user terminal 130).

The gateway 115 may use an antenna 110 to transmit the signal to the satellite 105. In one embodiment, the antenna 110 is a parabolic reflector with high directivity in the direction of the satellite 105 and low directivity in other directions. The downstream signals 135, 150 may include, for example, one (or more) single carrier signals. In some embodiments, the gateway 115 transmits a signal on each carrier made up of a series of physical layer frames. Each of the frames may have a physical layer header including a number of subcode blocks (e.g., in one embodiment each physical layer header includes three Walsh code blocks). Each single carrier signal may be divided in time (e.g., using Time Division Multiple Access (TDMA) or other time division multiplexing techniques) into a number of sub-channels. The sub-channels may be the same size, or different sizes, and a range of options will be addressed below. In some embodiments, other channelization schemes may be integrated with or used in place of time divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of the antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more user terminals 130. In one embodiment, the satellite 105 operates in a multi-beam mode, transmitting a number of narrow beams each directed at a different region of the earth, allowing for frequency re-use. With such a multi-beam satellite 105, there may be any number of different signal switching configurations on the satellite 105, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The signals transmitted from the satellite 105 may be received by one or more user terminals 130, via the respective user antenna 125. Symbol timing may be acquired using a variety of novel signal processing techniques described herein. Aspects of the wireless signal (e.g., in-phase and quadrature channels) may each be sampled at a rate of one sample per symbol. These samples may be interpolated to generate an early interpolation and a late interpolation. A difference measurement is obtained between the early interpolation of an in-phase and quadrature pair and the late interpolation for the in-phase and quadrature pair (e.g., an early radius value representative of the early interpolation for the pair may be subtracted from a later radius value representative of the later interpolation for the pair). Such difference measurements may be taken for a series of the pairs, and the set of difference measurements may be averaged. Symbol timing may be modified based on the average. This process may be continued on an iterative basis until symbol timing is acquired.

In one embodiment, the user antenna 125 and user terminal 130 together make up a very small aperture terminal (VSAT). In other embodiments, a variety of other types of user antennas 125 may be used at the user terminal 130 to receive the signal from the satellite 105. Each of the user terminals 130 may be a single user terminal or, alternatively, be a hub or router (not pictured) that is coupled with multiple user terminals. Each user terminal 130 may be connected to consumer premises equipment (CPE) 160 (e.g., computers, local area networks, Internet appliances, wireless networks, etc.).

A Multi-Frequency Time-Division Multiple Access (MF-TDMA) scheme is used for upstream links 140, 145, allowing efficient streaming of traffic while maintaining flexibility in allocating capacity among each of the user terminals 130. In this embodiment, a number of frequency channels are allocated which may be fixed, or which may be allocated in a more dynamic fashion. A TDMA scheme is then employed in each frequency channel. In this scheme, each frequency channel may be divided into several timeslots that can be assigned to a connection (i.e., a user terminal 130). In other embodiments, one or more of the upstream links 140, 145 may be configured with other schemes, such as TDMA, FDMA, OFDMA, CDMA, or any number of hybrid or other schemes known in the art.

A user terminal 130 may transmit information related to signal quality to the gateway 115 via the satellite 105. The signal quality may be a measured signal-to-noise ratio, an estimated signal-to-noise ratio, a bit error rate, a received power level, or any other communication link quality indicator. The user terminal 130 itself may measure or estimate the signal quality, or it may pass information measured or estimated by other devices. A user terminal 130 may also transmit data and information to a network 120 destination via the satellite 105 and gateway 115. The user terminal 130 transmits the signals via the upstream uplink 145 to the satellite 105 using the antenna 125. A user terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement ACM, adjusting the modulation and coding formats to each terminal or set of terminals based on their link conditions.

Figure 2A:
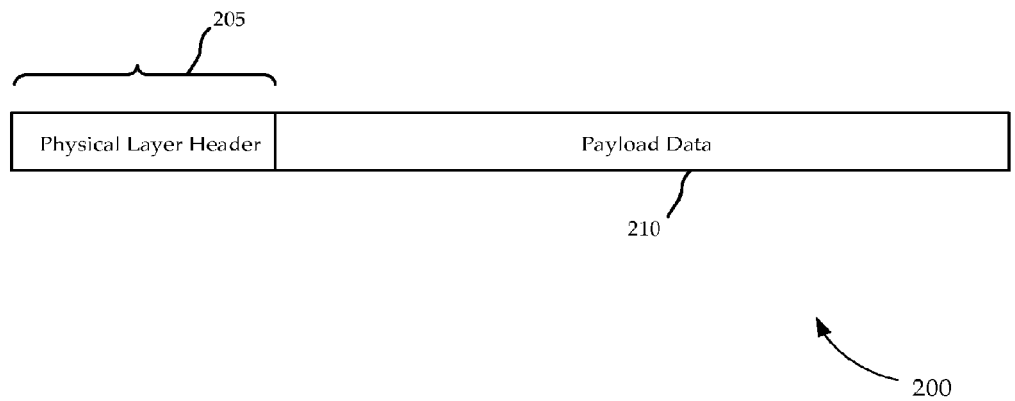
FIGS. 2A and 2B are block diagrams illustrating example physical layer frame formats according to various embodiments of the invention.

When a gateway 115 has selected the applicable modulation and coding, it may encapsulate data received from the network 120 to be transmitted via the satellite 105 to a subscriber terminal 130. FIG. 2A is a block diagram illustrating an example physical layer frame format 200 that may be used. A physical layer header 205 may be made up of encoded data including a sub-channel identifier and modulation and coding data. The physical layer header 205 may be made up of a code block including a number of subcode blocks. In one embodiment, phase estimates of each subcode may be used to estimate and correct a frequency error. Any number of different techniques (e.g., using a known unique word in the physical layer header) may be used to identify the location of the physical layer header 205 or the start of a frame 200.

The payload data 210 may be the payload for the physical layer frame 200, and may be one or more IP packets, encapsulated in a MAC frame which is FEC encoded and modulated (e.g., it may be, or be equivalent to, a FEC or XFEC frame under the DVB-S2 standard).

The physical layer header 205 (or parts thereof) may be protected by very low code rates so that it may be reliably received during excellent, or poor, SNR conditions. The modulation and coding data in the physical layer header 205 may identify the modulation and coding (e.g., the particular codeword sizes, code rates, modulation schemes, and pilot insertions) for encoded and modulated payload data 210 that is appended to the physical layer header 205. The encoded and modulated payload data 210, however, is in many embodiments adaptively coded on a per-terminal (or per set of terminals) basis. By way of example, user terminal 130 receiving a transmitted signal at a very low SNR may receive a frame 200 in which the encoded and modulated payload data 210 has been encoded at a very low code rate and at a very low order modulation. Conversely, a user terminal 130 receiving a transmitted signal at a very high SNR may receive a frame 200 in which the encoded and modulated payload data 210 has been encoded at a very high code rate and at a very high order modulation.

In addition, physical layer header 205 may include a sub-channel identifier configured to identify different frames as belonging to particular sub-channels. By utilizing sub-channel identifiers in a physical layer header 205, receiving devices (e.g., the user terminals 130) may filter packets based on the sub-channel identifier without demodulating or decoding the payload data 210. Thus, the information to be demodulated and decoded (e.g., payload data 210 directed to other sub-channels and other user terminals 130) may be limited or otherwise filtered thereby. A given sub-channel may, therefore, be a fraction (e.g., $\frac{1}{4}$, $\frac{1}{8}$, $\frac{1}{16}$) of the downstream channel. A user terminal 130 may be configured to filter a frame 200, demodulating and decoding payload data 210 only if the sub-channel identifier in the physical layer header 205 matches one or more sub-channels for the user terminal 130.

Figure 2B:
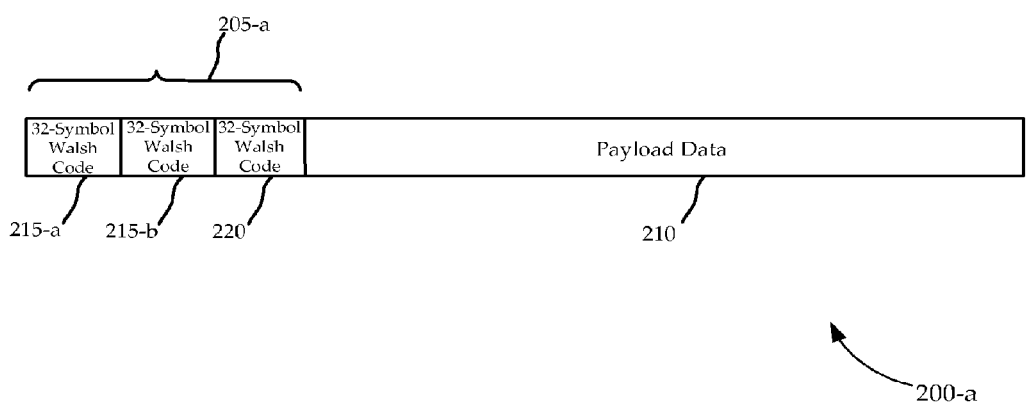

FIG. 2B illustrates an example embodiment of physical layer frame 200-a, which may be the physical layer frame of FIG. 2A. As noted above, a physical layer header 205 may be a code structure with a number of subcodes. In the example, the physical layer header 205-a is a 96-symbol physical layer header at the start of each physical layer frame 200-a. The physical layer header 205-a includes three 32-symbol signaling words ((32,5) Walsh codes), which may be the subcodes used for calculating a frequency estimate.

In one embodiment, the first two Walsh code blocks 215 each include five bits of information, while the third Walsh code block 220 includes parity (or other redundancy) information. In some embodiments, the first 16 bits of each code block have certain symmetric relationships with the second 16 bits of the respective code block. Such symmetrical, or asymmetrical, properties within the structure of a code may be used to identify the starting point of the frame or a future frame, and/or the location of the header. Other codes may be used in other embodiments (e.g., different codes, of different lengths), and the symmetrical or asymmetrical properties with the structure of the code may be used to identify the start and synchronize the incoming frames. A variety of techniques may be used to estimate and correct frequency errors, as well.

Figure 3:
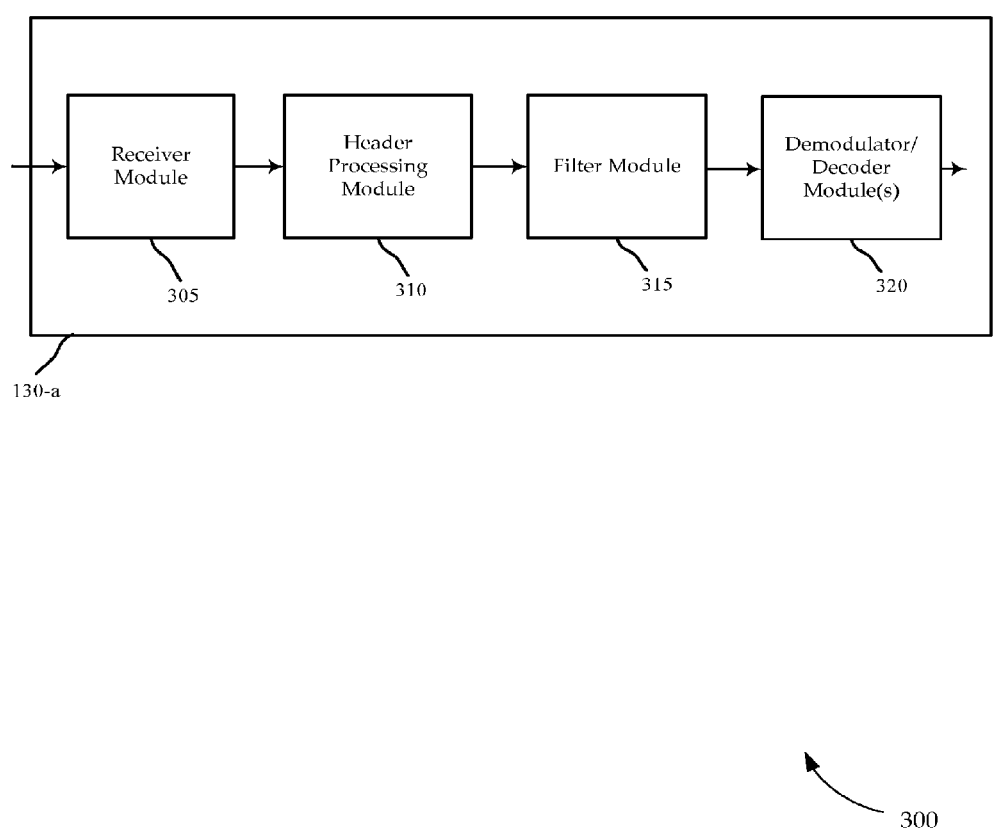
FIG. 3 is a block diagram of a user terminal for a satellite communications system configured according to various embodiments of the invention.

Referring next to FIG. 3, an embodiment of a user terminal 130-a (e.g., the user terminal 130 of FIG. 1) is shown in block diagram form 300. In this embodiment, the user terminal 130-a includes a receiver module 305, a header processing module 310, a filter module 315, and a demodulator/decoder module(s) 320, each in communication with each other directly or indirectly. These modules of the device may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each unit may include memory, or accessed memory may be elsewhere on or off the user terminal 130-a.

The receiver module 305 may be configured to receive a wireless signal transmitted via a satellite. This may, for example, be the signal transmitted from the gateway 115 through the satellite 105 as described with reference to FIG. 1, received via the user antenna 125. The receiver module 305 may downconvert and digitize the signal. In digitizing the received signal, the receiver module 305 may perform symbol timing recovery. In one embodiment, in-phase and quadrature samples are each generated by the receiver module 305 at a rate of one sample per symbol. The samples are run through a pair of filters that interpolate to ¼ symbol period early and ¼ symbol period late. Early and late in-phase and quadrature pairs may be processed to get a symbol timing error metric. The errors may be averaged to normalize the error with respect to step size, and then used (e.g., input to a PI control loop) to acquire and track the symbol timing. A number of alternative symbol timing schemes may be used in other embodiments.

In addition, the receiver module 305 may detect and remove quadrature errors, perform coarse frequency rotation, and provide matched filtering functions. The digitized signal may be forwarded by the receiver module 305 to the header processing module 310. The header processing unit 310 may, therefore, receive a digitized physical layer signal made up of a series of symbols representative of the received wireless signal. This digitized stream may be made up of in-phase and quadrature components.

The header processing module 310 may process the digitized stream to detect a start of frame (e.g., physical layer frame 200 for FIG. 2A or 2B) location. The header processing module 310 may use a variety of different techniques to identify the start of frame/physical layer header location. The header processing module 310 may then demodulate and decode a physical layer header (e.g., physical layer header 205 for FIG. 2A or 2B) to identify a sub-channel identifier for a physical layer payload (e.g., physical layer payload 210 for FIG. 2A or 2B) associated therewith. A frequency estimate may be obtained by the header processing module 310 using a novel delta-theta method performed within, or between, physical layer headers. As noted, the physical layer header may be made up of a code structure in which a number of subcodes is defined. Phase estimates of each subcode may be independently derived. The subcode phase estimates are used to estimate a frequency error, which in turn may be used to correct the frequency for the received wireless signal. In some embodiments, other frequency estimation techniques may be used.

A filter module 315 may be configured to store one or more sub-channel identifiers (for example, sub-channel identifiers such as those in the physical layer header 205 in FIG. 2), the stored sub-channel identifiers indicating whether physical layer payload associated with the particular sub-channel identifier is to be demodulated and decoded by the user terminal 130-a. The filter module 315 may include the memory storing the information, or may access external or other on-chip memory. The filter module 315 may determine whether a given sub-channel identifier matches one or more of the stored identifiers indicating that an associated physical layer payload should be dropped before further demodulation and decoding. As indicated by the sub-channel identifier, the filter module 315 may then either (a) drop (or otherwise filter) the physical layer payload associated with the header portion to prevent demodulation and decoding, or (b) forward the physical layer payload associated with the second header portion to the demodulator/decoder module(s) 320. The filter module 315 and the demodulator/decoder module(s) 320 need not be included in some embodiments.

Figure 4:
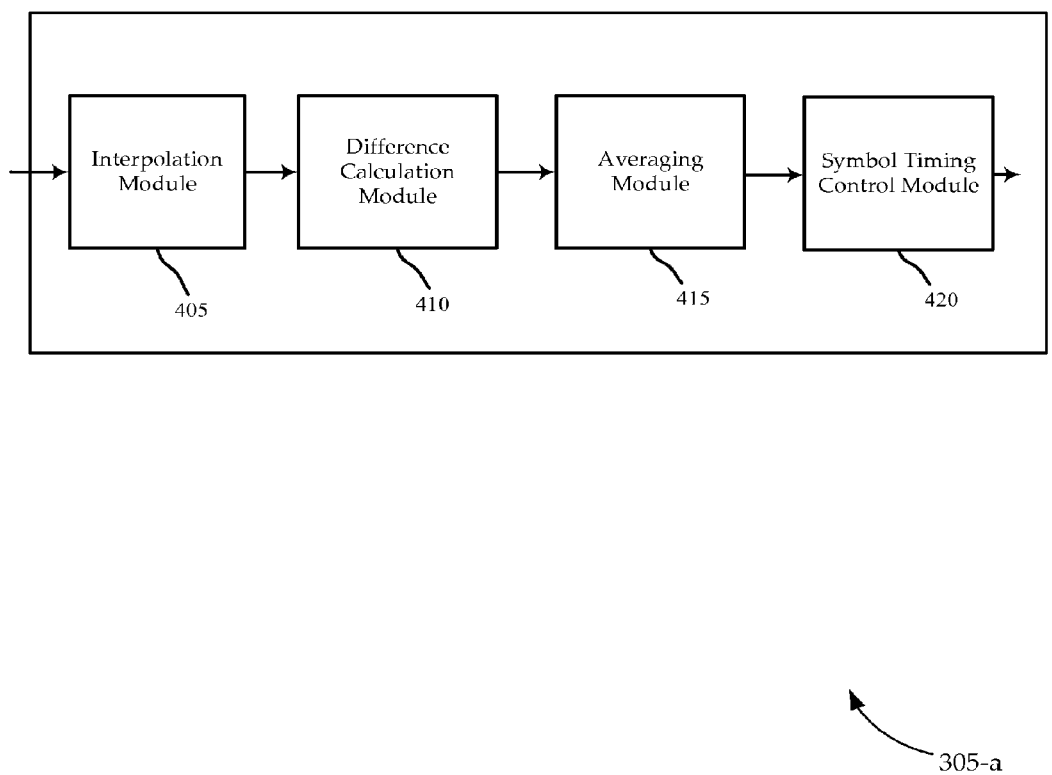
FIG. 4 is a block diagram of a device for symbol timing acquisition configured according to various embodiments of the invention.

As set forth above, there are a number of options for acquiring symbol timing. Turning next to FIG. 4, a block diagram is shown illustrating a portion of a receiver module 305-a (e.g., receiver module 305 of FIG. 3, implemented in the terminal 130 of FIG. 1 or 3). Modules within the receiver module 305-a (individually or collectively) may be implemented in one or more other processors and/or devices, as well. The receiver module 305-a of the illustrated embodiment includes an interpolation module 405, difference calculation module 410, averaging module 415, and a symbol timing control module 420.

In one embodiment, the receiver module 305-a may receive a wireless signal (e.g., from the gateway 115 via the satellite 105 of FIG. 1). A filter or other sampling module (not shown) may sample channels of the wireless signal at a rate of substantially one sample per symbol, and combine these samples to generate a series of samples.

An interpolation module 405 may interpolate each of the series samples to generate an early interpolation and a late interpolation for each of the samples. A difference calculation module 410 may calculate a difference measurement between the early interpolation and the late interpolation for a set of samples (e.g., subtracting a radius value from an early interpolation of an in-phase/quadrature pair from a radius value from a late interpolation of the in-phase/quadrature pair).

An averaging module 415 may average the set the difference measurements, and a symbol timing control module 420 may modify the symbol timing for the sampling module based on the average. This process may the be repeated for additional sets of difference measurements, to iteratively correct the symbol timing error.

Figure 5:
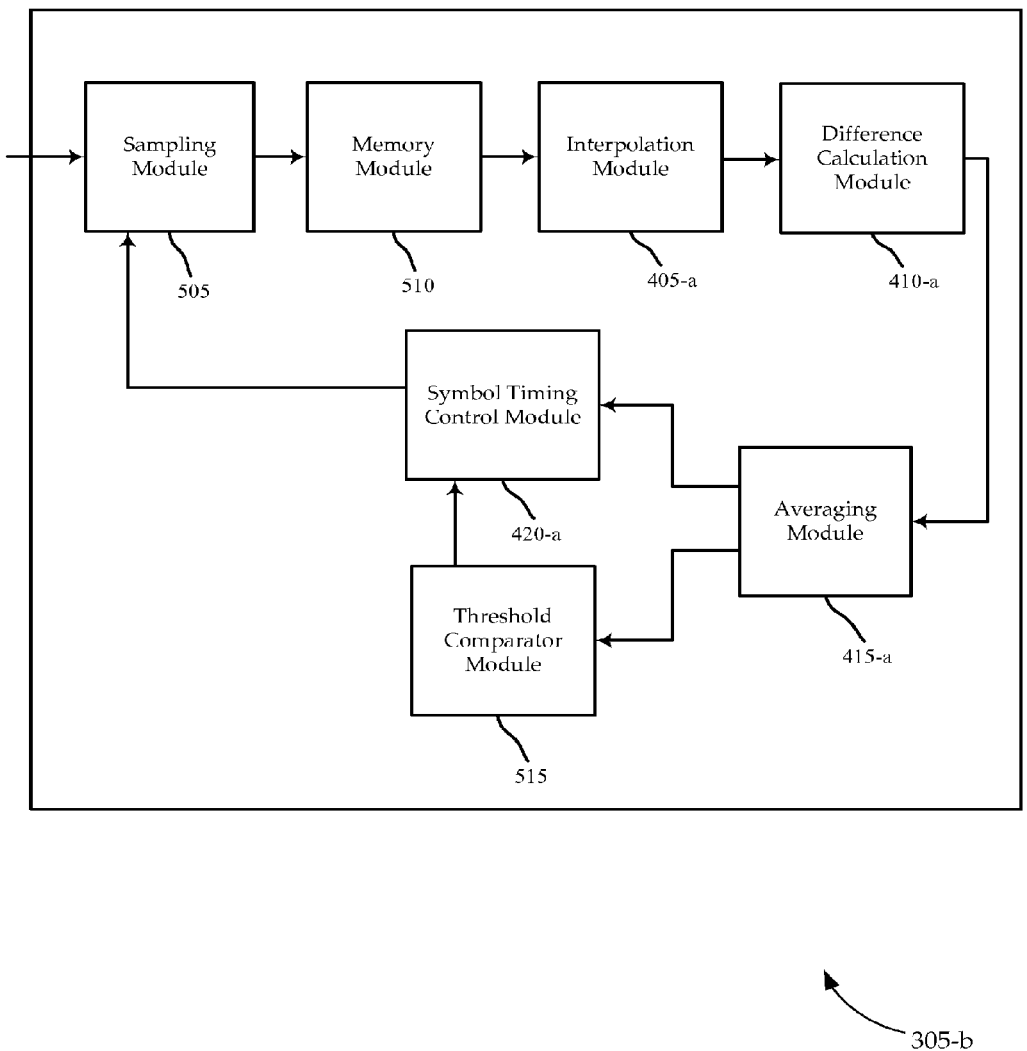
FIG. 5 is a block diagram of an alternative configuration of a device for symbol timing acquisition and tracking configured according to various embodiments of the invention.

Turning next to FIG. 5, a block diagram 305-b is shown illustrating a portion of a receiver module 305-b (e.g., receiver module 305 of FIG. 3 or 4, implemented in the user terminal 130 of FIG. 1 or 3). Modules within the receiver module 305-b (individually or collectively) may be implemented in one or more other processors and/or devices, as well. The receiver module 305-b of the illustrated embodiment includes a sampling module 505, a memory module 510, an interpolation module 405-a, a difference calculation module 410-a, averaging module 415-a, a symbol timing control module 420-a, and a threshold comparator module 515.

In one embodiment, the receiver module 305-b may receive a wireless signal (e.g., from the gateway 115 via the satellite 105 of FIG. 1). After some additional processing (e.g., downconversion and amplification, not shown), the sampling module 505 may sample channels at a rate of approximately one sample per symbol, and combine these samples to generate a series of samples. By way of example, the sampling module 505 may identify an in-phase channel and a quadrature channel. The in-phase channel may be sampled at a rate of one sample per symbol to generate a first subset of the series of samples comprising in-phase samples. The quadrature channel may be sampled at a rate of one sample per symbol to generate a second subset of the series of samples comprising quadrature samples. Together, the in-phase and quadrature samples may make up the generated series of samples.

The generated series of samples may be stored in the memory module 510, and then output to an interpolation module 405-*a*. In one embodiment, the generated series of samples are stored, at a first rate, in the memory module 510, and then read out from the memory module 510 at a second, slower rate. An interpolation module 405-*a* may interpolate each of the series of samples to generate an early interpolation and a late interpolation for each of the samples. In one embodiment, the interpolation is approximately ¼ symbol period early and ¼ symbol period late for each symbol.

A difference calculation module 410-*a* may calculate a difference measurement between the early interpolation and the late interpolation for a set of samples (e.g., identifying a difference between a value corresponding to an early interpolation of an in-phase/quadrature pair from a value corresponding to a late interpolation of the in-phase/quadrature pair). Thus, the difference measurement may correspond to a symbol timing error. The difference calculation module 410-*a* may calculate a difference measurement for a set of symbols (for example, the set of symbols for a particular period of time).

An averaging module 415-*a* may average the set the difference measurements (e.g., to identify an average symbol timing error metric). The set of difference measurements making up the group to be averaged may correspond to user-configurable or traffic-adaptable window size. The symbol timing control module 420-*a* may modify the symbol timing for the sampling module to correct the error based on the average.

This process may then be repeated for additional sets of difference measurements, to iteratively correct the symbol timing error. For example, the difference calculation module 410-*a* may obtain a difference measurement between the early interpolation and the late interpolation for additional sets of the samples (e.g., corresponding to consecutive later time periods). The averaging module 415-*a* may calculate an average of the difference measurements for each subsequent set (e.g., for each subsequent time period). The symbol timing control module 420-*a* may iteratively modify the symbol timing based on the averages for each set, to thereby correct the symbol timing error.

A threshold comparator module 515 may monitor the average of the sets of difference measurements, and determine when a symbol timing error value (corresponding to the monitored averages from one or more averaged sets) falls below a first threshold. The threshold may be a user-configurable or network-configurable metric. When the symbol timing error value falls below the threshold, the symbol timing lock may be asserted. With symbol timing lock asserted, symbol timing control module 420-*a* may decrease an amount of modification relative to the symbol timing error value when symbol timing is confirmed. Thus, when symbol timing lock is asserted, the symbol timing control module 420-*a* may switch to a tracking mode, and modification amounts may be set to smaller values providing a cleaner steady state tracking signal but not so small that the loop cannot track shifts in the symbol rate (due to Doppler and clock drift). The threshold comparator module 515 may continue to monitor the averages of additional sets of difference measurements. If the symbol timing error value increases (e.g., above a second threshold, different from and higher than the threshold), symbol timing lock lost may be asserted, and the mode may revert to an acquisition mode, and the modification amount may be set to larger values allowing for a wider pull-in range and faster acquisition.

Turning now to a more particularly described set of embodiments, the symbol timing acquisition described above may be achieved by means of an early/late symbol radius matching scheme and PT controller. The raw early/late error value may be block averaged to a number of symbol periods. The PI controller may be updated with the block averaged error value at the decimated symbol rate.

This scheme may also include a symbol timing lock detection mechanism that outputs a symbol lock indicator. There are different sets of gains for the PI controller (e.g., a wideband gain and a narrowband gain). In one embodiment, when not in timing lock, the wideband gains are used; otherwise, the narrowband gains are used.

Figure 6:
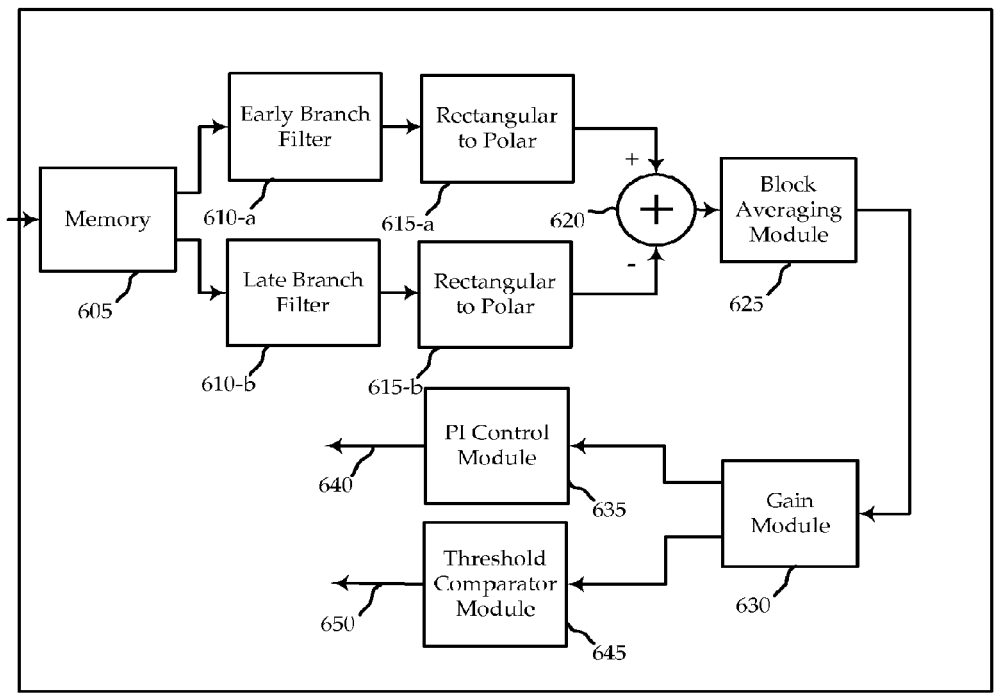
FIG. 6 is a block diagram illustrating a symbol timing module according to various embodiments of the invention.

Referring to FIG. 6, a block diagram illustrates a symbol timing module 600 that may be implemented, for example, in the receiver module 305 of FIG. 3, 4, or 5. A matched filter (not shown) in the receiver module 305 may implement a polynomial-based interpolation function. For example, this may be a variable rate interpolating decimation filter that is configured to output in-phase and quadrature samples at a rate of one sample per symbol. In one embodiment, this is a Farrow filter.

The symbols output from the matched filter may be stored in memory 605 (e.g., this may be memory module 510 of FIG. 5). In one embodiment, at high symbol rates, the matched filters will be generating two in-phase/quadrature pairs per core clock. The memory 605 may be a small RAM configured to buffer the in-phase/quadrature pairs, providing for block processing at a lower rate. In this fashion, symbol timing acquisition and tracking may be operated on non-continuous blocks of filtered symbols.

From the memory module 605, the in-phase and quadrature samples are run through filters 610 (e.g., FIR filters) that provide an early interpolation and a late interpolation. These filters 610 may be the interpolation module 405 of FIG. 4 or 5. Early branch filter 610-*a* may interpolate to ¼ symbol period early, and late branch filter 610-*b* may interpolate to ¼ symbol period late. The early and late in-phase/quadrature pairs may then be converted to polar coordinates by the rectangular to polar modules 615. At block 620 (which may, for example, be difference calculation module 410 of FIG. 4 or 5), the later radius value may be subtracted from the early radius value to get a symbol timing error metric.

A block averaging module 625 (which may be averaging module 415 of FIG. 4 or 5) averages the errors over a series of metrics. In one embodiment, the errors are block averaged over $2^N$ metrics, where N is programmable and may be an integer from seven to ten (thus, the window size may range from 128 to 1024). Smaller, or larger, window sizes are possible as well. The average value from the block averaging module 625 may be input into a gain module 630 to normalize the error. For example, the gain module 630 may multiply the average value by a symbol rate dependent gain to normalize the error with respect to the symbol rate.

The output of the gain module 630 may be input to a PI control module 635 (which may be the symbol timing control module 420 of FIG. 4 or 5). The PI control module 635 may, in one embodiment, be updated once per block average. The output 640 of the PI control module 635 is the symbol timing error. In one embodiment, this error is at least an 18-bit value to provide the ±100 ppm pull-in range at the highest symbol rate. A threshold comparator module 645 may receive the output of the gain module 630, as well. The threshold comparator module 645 may monitor the symbol timing error value to determine symbol timing lock when one or more error values fall below a certain threshold. The threshold for the threshold comparator module 645 may be programmable. The threshold comparator module 645 may output a symbol lock signal 650 upon signal lock.

The PI control module 635 gains may be selected by the state of the symbol lock signal 650. For example, when not in symbol lock, wideband gains may be used; otherwise, the narrowband gains are used. The wideband gains may be set to larger values allowing for a wider pull-in range and faster acquisition. The narrowband gains may be set to smaller values providing a cleaner steady state tracking signal but not so small that the loop cannot track shifts in the symbol rate (due to Doppler and clock drift). In other embodiments, there may be additional loop gain parameters (e.g., allowing for faster or slower loop gains to provide for more granularity in different conditions).

The functional modules of the receiver module 305 of FIG. 4 or 5, or the symbol timing module 600 of FIG. 6 may each, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 7:
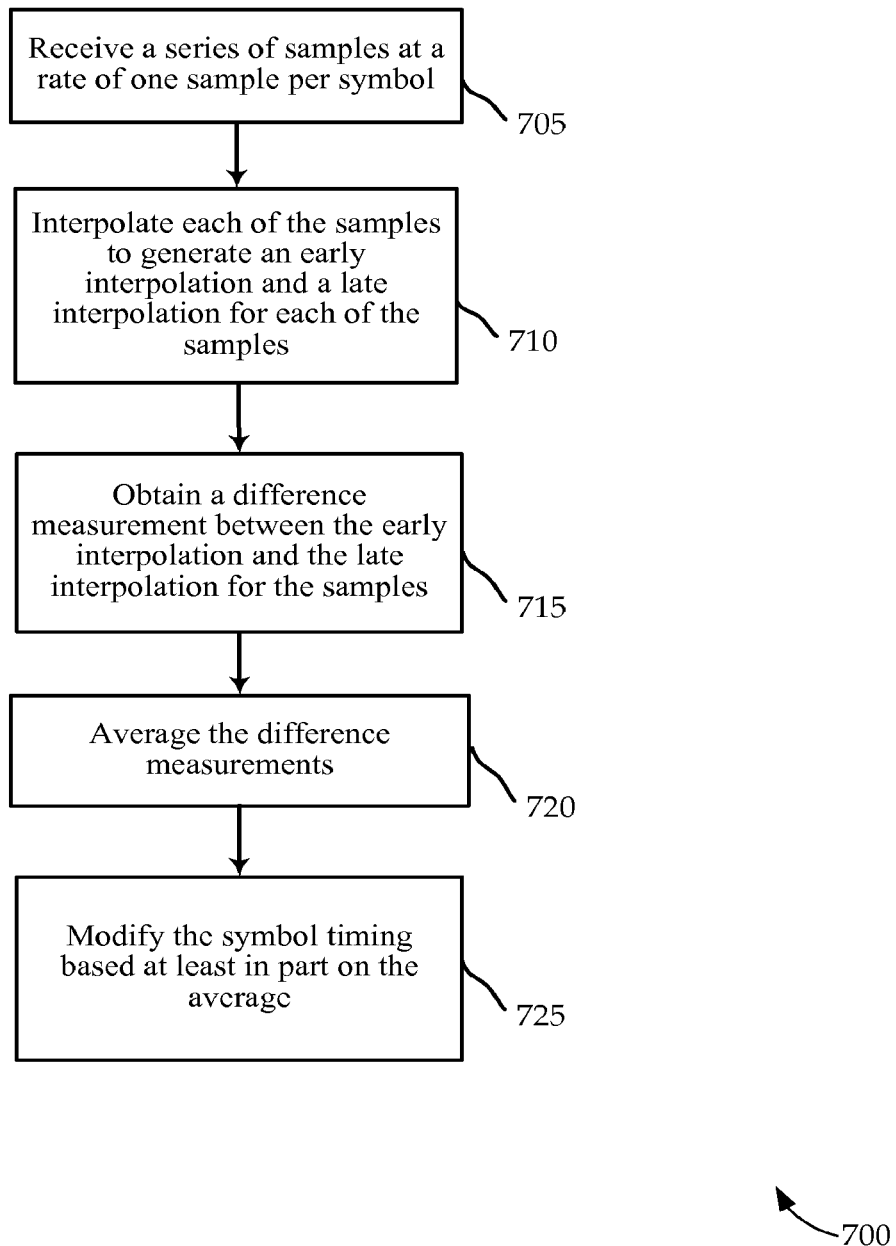
FIG. 7 is a flow chart illustrating a method of symbol timing acquisition configured according to various embodiments of the invention.

FIG. 7 is a flowchart illustrating a method 700 for acquiring symbol timing according to various embodiments of the invention. The method 700 may be performed, for example, in whole or in part, by the user terminal 130 described with reference to FIG. 1 or 3, or, more specifically, with the receiver module 305 of FIG. 3, 4, or 5, or the symbol timing module 600 of FIG. 6.

At block 705, a series of samples is received, each sample of the series sampled at a rate of substantially one sample per symbol. At block 710, each of the samples is interpolated to generate an early interpolation and a late interpolation for each of the samples. At block 715, a difference measurement between the early interpolation and the late interpolation for the samples is obtained. At block 720, the difference measurements are averaged. At block 725, the symbol timing is modified based at least in part on the average.

Figure 8:
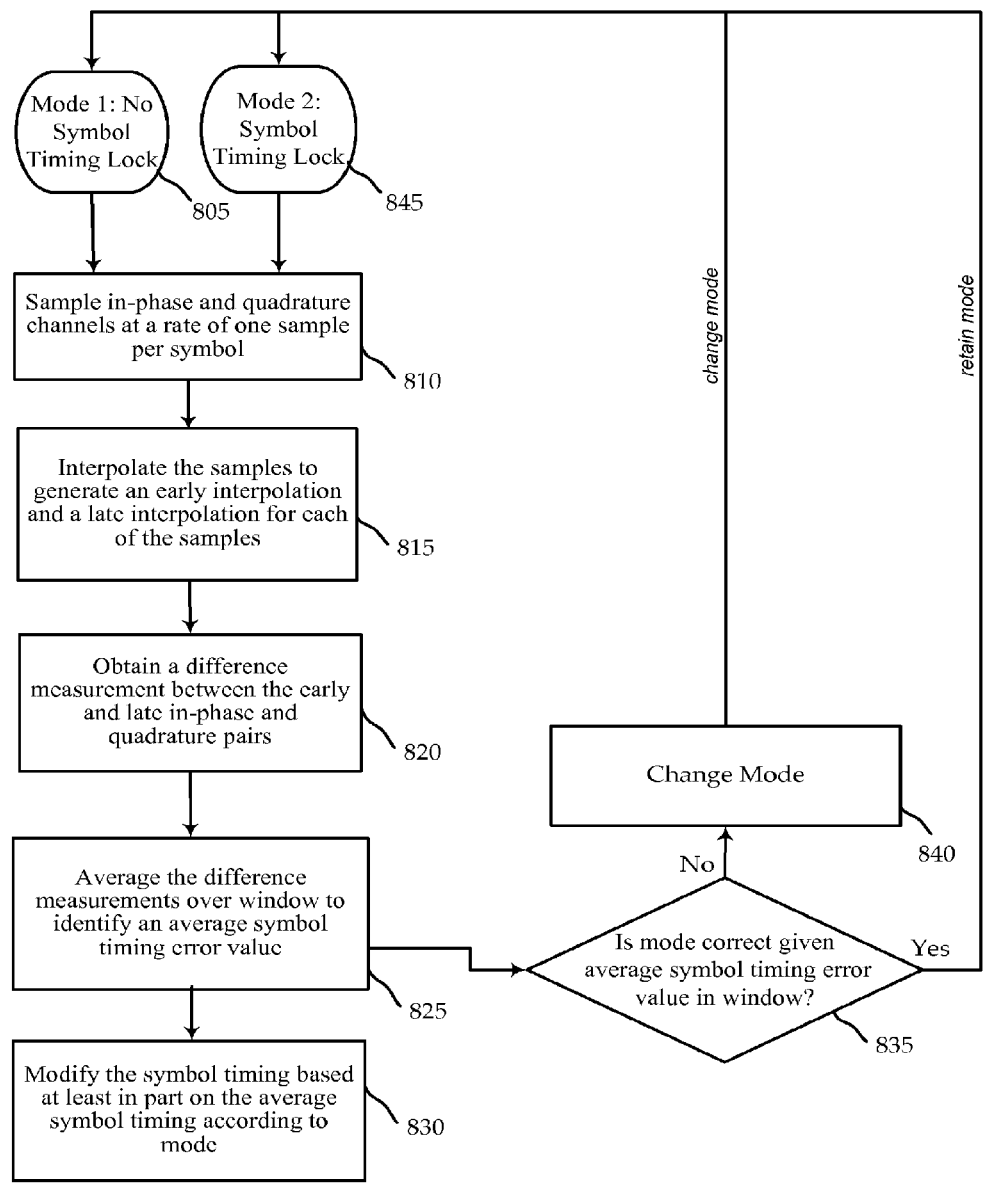
FIG. 8 is a flow chart illustrating a method for symbol timing acquisition and tracking according to various embodiments of the invention.

FIG. 8 is a flowchart illustrating a method 800 for symbol timing acquisition and tracking according to various embodiments of the invention. The method 800 may be performed, for example, in whole or in part, by the user terminal 130 described with reference to FIG. 1 or 3, or, more specifically, with the receiver module 305 of FIG. 3, 4, or 5, or the symbol timing module 600 of FIG. 6.

Assume that, for purposes of discussion, the method begins at block 805 in Mode 1, where there is no symbol timing lock. At block 810, in-phase and quadrature channels of a received wireless signal are sampled at a rate of one sample per symbol. At block 815, the samples are interpolated to generate an early interpolation and a late interpolation for each of the samples. At block 820, a difference measurement is obtained between early and late in-phase and quadrature pairs.

At block 825, the difference measurements over a window are averaged to identify an average symbol timing error value. At block 830, the symbol timing is modified based at least in part on the average symbol timing according to the mode. At block 835, a determination is made whether the mode is correct given the average symbol timing error value in the window. If the mode is not correct, the mode is changed (e.g., from Mode 1 to Mode 2 at block 840), and the method restarts (e.g., in Mode 2 where there is symbol timing lock at block 845). If the mode is correct, the mode is retained, and the method restarts (e.g., in Mode 1 where there is not symbol timing lock, at block 805).

Figure 9:
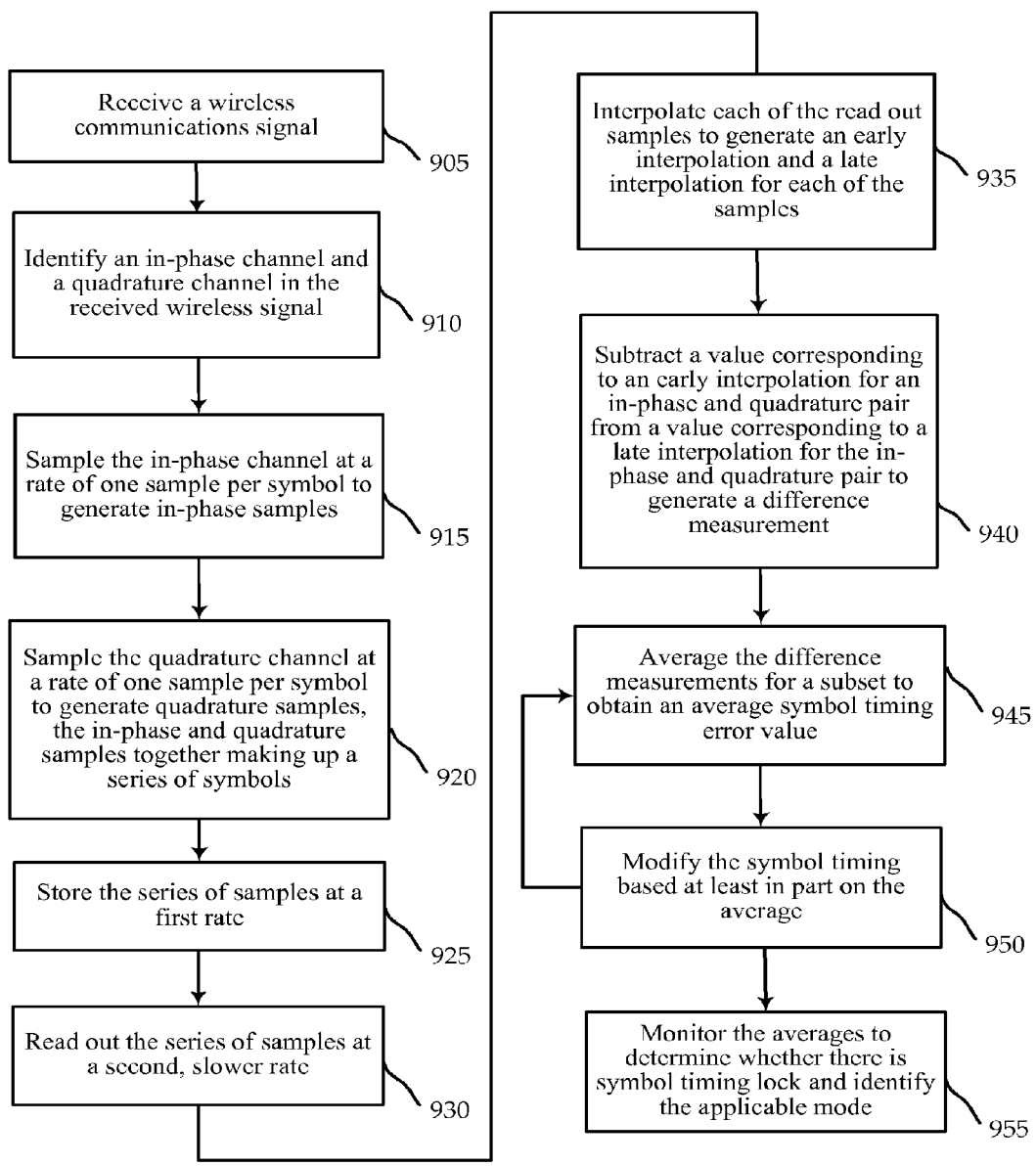
FIG. 9 is a flow chart illustrating an alternative method for symbol timing acquisition and tracking according to various embodiments of the invention.

FIG. 9 is a flowchart illustrating a method 900 for symbol timing acquisition and tracking according to various embodiments of the invention. The method 900 may be performed, for example, in whole or in part, by the user terminal 130 described with reference to FIG. 1 or 3, or, more specifically, with the receiver module 305 of FIG. 3, 4, or 5, or the symbol timing module 600 of FIG. 6.

At block 905, a wireless communications signal is received. At block 910, an in-phase channel and a quadrature channel are identified in the received wireless signal. At block 915, the in-phase channel is sampled at a rate of one sample per symbol to generate in-phase samples. At block 920, the quadrature channel is sampled at a rate of one sample per symbol to generate quadrature samples, the in-phase and quadrature samples together making up a series of symbols.

At block 925, the series of samples is stored at a first rate. At block 930, the series of samples is read out at a second, slower rate. At block 935, each of the read out samples is interpolated to generate an early interpolation and a late interpolation for each of the samples. At block 940, a value corresponding to an early interpolation for an in-phase and quadrature pair is subtracted from a value corresponding to a late interpolation for the in-phase and quadrature pair to generate a difference measurement. At block 945, the difference measurements for a subset of the series are averaged to obtain an average symbol timing error value. At block 950, the symbol timing is modified based at least in part on the average. Block 945 and block 950 may be repeated to iteratively correct the symbol timing. At block 955, the averages are monitored on an ongoing basis to determine whether there is a symbol timing lock and set the appropriate mode.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory module" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A device for achieving symbol timing, the device comprising:
    a sampling module configured to:
        receive a signal comprising a series of symbols; and
        sample the signal at a rate of one sample per symbol to generate a series of samples;
    an interpolation module, communicatively coupled with the sampling module, and configured to interpolate each of the samples to generate an early interpolation and a late interpolation for each of the samples;
    a difference calculation module, communicatively coupled with the interpolation module, and configured to calculate difference measurements between the early interpolation and the late interpolation for each of at least a first subset of the samples and a plurality of additional subsets of the samples, the plurality of additional subsets received after the first subset;
    a filtering module, communicatively coupled with the difference calculation module, and configured to obtain filtered difference measurements based on performing a filtering function on the difference measurements for the at least the first subset and the plurality of additional subsets;
    a symbol timing control module, communicatively coupled with the averaging module, and configured to iteratively modify symbol timing for the sampling module based at least in part on the filtered difference measurements; and
    a threshold comparator module, communicatively coupled with the filtering module, and configured to
        monitor the filtered difference measurements for the first subset and the plurality of additional subsets; and
        determine when a symbol timing error value corresponding to the filtered difference measurements falls below a threshold to confirm that symbol timing is achieved.

2. The device of claim 1, wherein the sampling module is configured to sample the signal at a rate of one sample per symbol by:
    identifying an in-phase channel and a quadrature channel in the received signal;
    sampling the in-phase channel at a rate of one sample per symbol to generate a first subset of the series of samples comprising in-phase samples; and
    sampling the quadrature channel at a rate of one sample per symbol to generate a second subset of the series of samples comprising quadrature samples.

3. The device of claim 1, wherein the interpolation module is configured to perform each early interpolation one-quarter symbol period early, and to perform each late interpolation one-quarter symbol period late.

4. The device of claim 1, wherein the symbol timing control module is further configured to decrease an amount of modification relative to the symbol timing error value when symbol timing is confirmed.

5. The device of claim 1, wherein the received signal comprises a wireless signal.

6. The device of claim 5, wherein the wireless signal is received via a satellite in a satellite communications system.

7. A method comprising:
    receiving a series of samples of a signal, each sample of the series sampled at a rate of one sample per symbol;
    interpolating each of the samples using one or more processors to generate an early interpolation and a late interpolation for each of the samples;
    obtaining difference measurements between the early interpolation and the late interpolation for at least a first subset of the samples and a plurality of additional subsets of the samples, the plurality of additional subsets received after the first subset;
    filtering the difference measurements for the at least the first subset and the plurality of additional subsets to obtain filtered difference measurements;
    iteratively modifying the symbol timing based at least in part on the filtered difference measurements;
    monitoring the filtered difference measurements for the first subset and the plurality of additional subsets; and
    determining when a symbol timing error value corresponding to the filtered difference measurements falls below a threshold to confirm that symbol timing is achieved.

8. The method of claim 7, further comprising:
    receiving the signal; and
    sampling an in-phase channel of a time segment of the received communications signal at a rate of one sample per symbol and sampling a quadrature channel of the time segment of the received communications signal at a rate of one sample per symbol, to generate the series of samples.

9. The method of claim 7, wherein receiving the series of samples comprises:
    receiving a first subset of the series of samples comprising in-phase samples, the in-phase samples sampled at a rate of one sample per symbol; and receiving a second subset of the series of samples comprising quadrature samples, the quadrature samples sampled at a rate of one sample per symbol.

10. The method of claim 7, wherein obtaining a difference measurement between the early interpolation and the late interpolation comprises:
subtracting a value comprising the early interpolation for an in-phase and quadrature pair from a value comprising the late interpolation for the in-phase and quadrature pair.

11. The method of claim 7, further comprising:
storing, at a first rate, a series of samples; and
outputting, at a second rate slower than the first rate, the stored series of samples, wherein the output series of samples comprises the received series of samples.

12. The method of claim 7, wherein each early interpolation is one-quarter symbol period early, and each late interpolation is one-quarter symbol period late.

13. The method of claim 7, further comprising:
obtaining a difference measurement between the early interpolation and the late interpolation for at least a second subset of the samples, the second subset received after the first subset;
filtering the difference measurements for the second subset; and
modifying the symbol timing based at least in part on the filtering for the second subset.

14. The method of claim 7, further comprising:
decreasing an amount of modification relative to the symbol timing error value when symbol timing is confirmed.

15. The method of claim 7, wherein the communications signal comprises a wireless communications signal.

16. The method of claim 7, wherein the one or more processors comprise one or more application specific integrated circuits, field programmable gate arrays, general purpose processors, or application-specific processors.

17. The method of claim 7, wherein the received series of samples comprises a subset of the sampled symbols of the signal.

18. A device for achieving symbol timing, the device comprising:
means for receiving a series of samples, each sample of the series sampled at a rate of one sample per symbol;
means for interpolating each of the samples to generate an early interpolation and a late interpolation for each of the samples;
means for obtaining difference measurements between the early interpolation and the late interpolation for at least a first subset of the samples and a plurality of additional subsets of the samples, the plurality of additional subsets received after the first subset;
means for filtering the difference measurements for the at least the first subset and the plurality of additional subsets to obtain filtered difference measurements;
means for iteratively modifying the symbol timing based at least in part on the filtered difference measurement;
means for monitoring the filtered difference measurements for the first subset and the plurality of additional subsets; and
means for determining when a symbol timing error value corresponding to the filtered difference measurements falls below a threshold to confirm that symbol timing is achieved.

19. The device of claim 18, further comprising:
means for receiving a communications signal; and
means for sampling a version of the communications signal to generate the series of samples.

20. A system for achieving symbol timing, the system comprising:
a source device configured to transmit a communication signal; and
a terminal device, in communication with the source device via a communication medium, and configured to:
receive the communication signal;
sample an in-phase channel associated with the received communication signal at a rate of one sample per symbol and sample a quadrature channel associated with the received communication signal to generate a series of symbols;
interpolate each of the samples to generate an early interpolation and a late interpolation for each of the samples;
obtain difference measurements between the early interpolation and the late interpolation for at least a first subset of the samples and a plurality of additional subsets of the samples, the plurality of additional subsets received after the first subset;
filter the difference measurements for the at least the first subset and the plurality of additional subsets to obtain filtered difference measurements;
iteratively modify the symbol timing based at least in part on the filtered difference measurement;
monitor the filtered difference measurements for the first subset and the plurality of additional subsets; and
determine when a symbol timing error value corresponding to the monitored filtered difference measurement falls below a threshold to confirm that symbol timing is achieved.

21. The system of claim 20, wherein:
the source device comprises a gateway;
the terminal device comprises user terminal; and
the communication signal comprises a wireless communication signal.

22. The device of claim 1, wherein the filtering function comprises averaging the difference measurements for the at least the first subset and the plurality of additional subsets.

23. The device of claim 7, wherein the filtering comprises averaging the difference measurements for the at least the first subset and the plurality of additional subsets.

24. The device of claim 18, wherein the means for filtering comprises means for averaging the difference measurements for the at least the first subset and the plurality of additional subsets.

25. The device of claim 20, wherein the terminal device is configured to average the difference measurements for the at least the first subset and the plurality of additional subsets.

* * * * *